Feb. 4, 1947.  C. L. EKSERGIAN  2,415,344
INERTIA CONTROL DEVICE
Filed Nov. 14, 1941
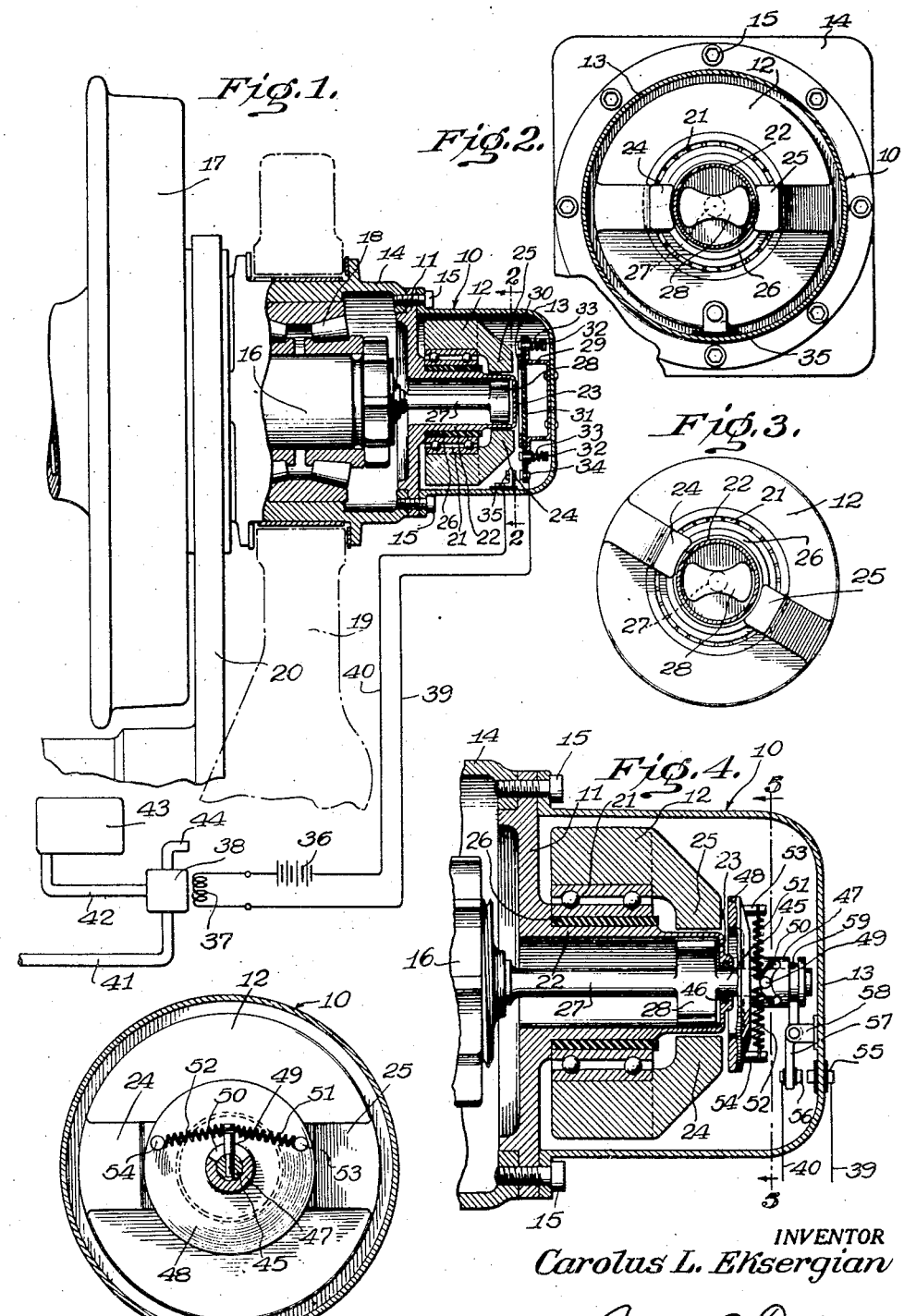
INVENTOR
Carolus L. Eksergian
BY John P. Dubo
ATTORNEY Patented Feb. 4, 1947

2,415,344

UNITED STATES PATENT OFFICE 2,415,344

INERTIA CONTROL DEVICE

Carolus L. Eksergian, Detroit, Mich., assignor to The Budd Company, Philadelphia, Pa., a corporation of Pennsylvania Application November 14, 1941, Serial No. 419,087

6 Claims. (Cl. 172—284)

The invention relates to inertia control devices and more particularly to such devices adapted to control the brakes of a vehicle.

In the braking of vehicles it is desirable to apply the braking force to the highest degree possible without causing the sliding of the wheels. It is, however, impossible to do this because of the varying adhesion between the wheels and track without causing the wheels to reach a sliding condition. Such sliding condition is to be avoided for two reasons, first, because the adhesion between a sliding wheel and the rail is very much less than the adhesion between a rolling wheel and the rail, and thus much of the braking effect is lost when a wheel slides. Second, slid wheels are quickly worn flat and have to be removed and reground or otherwise retrued. It is therefore, highly desirable to avoid wheel sliding and numerous devices have been suggested to release the braking force on a wheel once it begins to slip, so that it may never reach a sliding stage. Most such devices have been relatively complicated and difficult to install in locations where they were readily accessible and their installation and maintenance was relatively expensive.

It is an object of the invention to simplify the construction and installation of such devices and to provide a device of this class, which is light in weight and assured of a long life under the heavy pounding to which it is subjected in use.

It is also a further object of the invention to simplify the drive between the inertia member and the rotatable member which it controls.

These objects of the invention are attained in large part by the provision of a fixed support for the inertia member surrounding a part of the rotatable member and by making the drive between the rotatable member and the inertia member a magnetic drive. Under normal acceleration and deceleration of the rotatable member, the inertia member is dragged around with the rotatable member by an armature having its axis in line with the poles of a magnet carried by the inertia member. The inertia member may be, and preferably is, a permanent magnet. When, due to excessive acceleration or deceleration of the rotatable member, such as is due to wheel slip the inertia member overruns or lags behind the rotatable member and the armature is brought out of phase with the line joining the magnet poles, the magnetic lines of force through the armature are cut and become available to attract another armature located at such distance from the poles as to come under the influence of the magnet only when such out of phase relation between the first armature and the magnet poles obtains. The attraction of this second armature is utilized to control the brakes and effect their release.

Other and further objects and advantages and the manner in which they are attained will become apparent from the following detailed description when read in connection with the drawing forming a part hereof.

In the drawing,

Fig. 1 is a diagrammatic view, parts being in axial section, showing the device applied to the wheel and axle assembly of a rail vehicle.

Fig. 2 is a sectional view on an enlarged scale taken substantially on the line 2—2 of Fig. 1.

Fig. 3 is a similar view to Fig. 2 but omitting the outside casing and showing the parts in a different relative position.

Fig. 4 is an enlarged axial sectional view of a modified form of the device, and Fig. 5 is a sectional view taken substantially on the line 5—5 of Fig. 4.

The device as shown in Figs. 1 to 3 may be housed within a casing 10, preferably made of aluminum or other non-magnetic material. This casing may consists of an inner portion 11 mounting the inertia member 12 and an outer light cover portion 13. The casing so formed is adapted to be secured to the usual axle box 14 in place of the usual cover as by an annular series of bolts 15. The axle 16 to which the wheel 17 is rigidly secured is mounted in the axle box by the usual roller bearing 18 adapted to take radial and end thrust loads. The truck frame supported by the wheels and axles is indicated at 19 and a brake support at 20.

It is to be understood that the truck and brake arrangement shown is merely for illustration, for the device is adapted for use with any of the many existing types of trucks and brakes. In fact, in its broadest aspect, it is adapted for other uses than the use in which it is shown, namely, as a brake control device.

The inertia member 12 is mounted on antifriction bearings 21 upon a hollow cylindrical extension 22 of the casing portion 11 arranged coaxially with the axis of the axle 16. This extension is open at its inner end and closed at its outer end thus sealing the parts within the casing against the entrance of oil from the axle box. The outer end 23 of the extension 22 beyond the bearing 21 is made quite thin and the pole pieces 24 and 25 of the permanent magnet formed by the inertia member 12 are arranged in closely spaced relation to diametrically opposite parts of this thin outer end 23. To prevent pounding of the bearing and loss of magnetism by the inertia member 12 it is preferably mounted on a rubber sleeve 26 disposed between the inner bearing race and the extension 22.

To drive the inertia member 12 from the axle 16 the axle is provided with a reduced extension 27 extending into the hollow extension 22 and carrying at its outer end, in the plane of the pole pieces 24 and 25 a transversely elongated member 28 of magnetic material, the ends of which are rounded and in close proximity to the thin end 23 of the extension 22. Thus there is a relatively small gap between the rounded ends of the member 28, which constitutes an armature and the pole pieces 24 and 25 of the permanently magnetized inertia member 12.

When the armature 28 is arranged with its longitudinal axis aligned with the pole pieces, the lines of magnetic force tend to hold it in this position, and in all normal rates of acceleration or deceleration of the axle the inertia member is rotated with the axle, with the parts in approximately the relation shown in Fig. 2, solely through magnetic force. If now, the wheel on the axle 16 begins to slip, the axle decelerates very rapidly and the inertia of the mass of member 12 overcomes the magnetic force, causing the inertia member to overrun the axle and to move the armature 28 with its long axis in a position out of line with the poles 24 and 25. Thus a large gap is opened between the pole pieces and the armature 28 and the lines of magnetic force through the armature are broken. See Fig. 3.

This relative movement between the rotating axle and the inertia members may be utilized to control a switch operating a control circuit. One arrangement whereby this may be effected will now be described.

On a bracket 29 secured as by rivets to the outer wall of casing part 13 is mounted an annular armature 30 normally spaced some distance from the outer faces of the pole pieces 24 and 25. This armature is secured to a disc 31 of insulating material which is mounted on the bracket 29 and guided for in and out movement thereon by a plurality of pins 32 secured thereto and slidable in openings in the bracket. Springs 33 surrounding the pins normally urge the armature to its outer position spaced from the poles 24 and 25, as shown in Fig. 1.

The insulating disc 31 carries near its periphery a switch contact 34, this contact being located opposite another switch contact 35 secured in insulated relation to the casing part 13.

When the inertia member overruns the axle as shown in Fig. 3, and the lines of magnetic force through the armature 28 are broken, they act to attract the armature 30 and draw it toward the pole pieces against the action of the springs 33, thereby causing the switch contact 34 to close against switch contact 35 to operate the control circuit in which this switch is interposed.

Where the device is used as shown to control the brakes and prevent wheel slide, this switch may control a circuit indicated in Fig. 1 as comprising a battery 36, a coil 37 for operating a supply and release valve 38 and leads 39 and 40 connecting the switch in series with said battery and coil. The valve 38 may be of any well-known construction and normally is open to permit the passage of air from the supply pipe 41 through the pipe 42 to the brake cylinder 43. At such time the exhaust pipe 44 is cut off. When the coil 37 is energized by the closing of the switch 34, 35, the valve is operated to connect the pipe 42 to the exhaust pipe 44 and to cut off the supply pipe 41, thus releasing the pressure in the brake cylinder. This release of pressure will allow the slipping wheel to accelerate rapidly back to the speed of the vehicle, the inertia member acting during the excessive acceleration attained in such return to hold the switch closed and the brake pressure off until the wheel has substantially returned to speed. During the excessive acceleration of the wheel and axle in returning to speed the inertia member will lag behind the axle and cause the armature 30 to be attracted to the inertia member to close the control switch 34, 35 in the same manner as during the excessive deceleration at the beginning of wheel slip.

In Figs. 3 and 4 is shown a slightly modified form of switch operation for controlling the control circuit. In these figures parts corresponding to parts of the form shown in Figs. 1 to 3 are correspondingly numbered. In this form of the invention the reduced axle extension 27 is provided beyond the armature 28 with an extension 45 extending through a suitably packed opening 46 in the outer end of the hollow extension 22. Upon a freely slidable sleeve 47 mounted on this extension is carried the annular armature 48 corresponding to armature 30 in the form of Figs. 1 to 3. The longitudinal position of the armature 48 is determined by a pin 49 secured in extension 45 and projecting into an arcuate slot 50 in the sleeve 47. Springs 51 and 52 secured at their inner ends to the pin 49 and at their outer ends to pins 53 and 54, respectively, on the outer face of the armature 48 normally hold the armature spaced from the outer face of the pole pieces 24 and 25 keeping the pin 49 at the center of the arcuate slot 50 as shown in Figs. 4 and 5.

If the inertia member 12 overruns or lags behind the axle as hereinbefore described, the armature 48 will be attracted by the magnetic inertia member and tend to rotate with the latter, and, in such rotation by reason of the arcuate slot, it will move endwise toward the inertia member and in so doing operate a switch to control the circuit including leads 39 and 40. Such switch may comprise a contact 55 mounted in insulated relation on casing part 13 and electrically connected to lead 39 and another contact 56 for cooperation with contact 55 and mounted in insulated relation on one end of a lever 57 pivotally mounted between its ends on a bracket 58 on the casing, the opposite end of the lever being bifurcated and having inwardly extending pins (not shown) on its furcations seated in an annular groove 59 on the sleeve 46. It will be seen that inward axial movement of the sleeve will operate the switch contact to closed position. This switch arrangement is preferable to the form shown in Figs. 1 to 3, in that the switch is positively prevented by pin 49 from being unintentionally operated as a result of axial jars, whereas the springs 33 alone prevent such actuation in the form of Figs. 1 to 3.

From the foregoing detailed description, the operation of the device is believed clear. While two specific embodiments of the device have been described in detail, it will be understood by those skilled in the art that changes and modifications may be made without departing from the spirit and scope of the invention as disclosed in the appended claims.

I claim:

1. An inertia device responsive to excessive deceleration or acceleration of a rotatable member, an inertia element mounted to rotate coaxially with said member, said element comprising a permanent magnet, and an armature concentric with and rotating with said member and operative to magnetically drive said inertia element at the speed of the rotatable member when the latter is not accelerating or decelerating beyond a normal rate, the drive permitting the inertia element to overrun or lag behind said member upon excessive deceleration or acceleration of said member, and control means operable upon such overrun or lag of the inertia element.

2. An inertia control device comprising a rotatable member, an armature rotatable therewith an inertia element mounted to rotate concentrically with said rotatable member and normally driven at the speed of said rotatable member solely by means magnetically connected to said armature and permitting overrun or lag behind of said inertia element upon excessive deceleration or acceleration of said rotatable member, and a normally inactive armature arranged in such proximity to said means as to be actuated thereby upon such overrun or lag of the inertia element and control means responsive to the actuation of said normally inactive armature.

3. An inertia control device comprising a rotatable member, an armature rotatable therewith an inertia element mounted to rotate concentrically with said rotatable member and normally driven at the speed of said rotatable member solely by means magnetically connected to said armature and permitting overrun or lag behind of said inertia element upon excessive deceleration or acceleration of said rotatable member, and a normally inactive armature biased to inactive position but arranged in such proximity to said first-named means as to be actuated against the action of its biasing means by said first-named means upon such overrun or lag of the inertia element and control means responsive to the actuation of said normally inactive armature.

4. An inertia control device comprising a rotatable member, an inertia element mounted to rotate concentrically with said rotatable member and normally driven at the speed of said rotatable member, said drive comprising a rotatable armature normally positioned to extend between the poles of a magnet carried by the inertia element, an armature mounted to move axially toward and from said poles, said last-named armature being moved axially by the magnet toward the same when, due to excessive deceleration or acceleration, the inertia element overruns or lags behind the rotatable element so as to cause the lengthening or the cutting of the lines of force passing through said first-named armature.

5. An inertia control device, comprising a rotatable member, an inertia element comprising a permanent magnet rotatably mounted coaxially with said member and having diametrically opposite poles extended into close proximity to an elongated armature driven by said rotatable member and during normal driving having its longitudinal axis extending between said poles, whereby the rotation of said member magnetically effects rotation of said element at the same speed, the mass of the inertia element being such as to overrun or lag behind said rotatable member upon excessive deceleration or acceleration of said rotatable member, and control means actuated by said magnet upon such overrun or lag.

6. An inertia device of the class described comprising a rotatable member including an armature of magnetic material elongated transversely to its axis, and rotatable with its periphery in close proximity to the inner face of a hollow cylindrical support of non-magnetic qualities, an inertia element rotatably mounted on said support and comprising a permanent magnet having pole pieces diametrically opposite and arranged in the plane of said armature, whereby the rotation of said rotatable member magnetically drives said inertia element at the same speed but allows the inertia element to overrun or lag behind the rotatable member upon excessive acceleration or deceleration thereof, and control means actuated by said over run or lag of the inertia element.

CAROLUS L. EKSERGIAN.

REFERENCES CITED

The following references are of record in the file of this patent:

UNITED STATES PATENTS

| Number | Name | Date |
|---|---|---|
| 1,754,675 | Frank | Apr. 15, 1930 |
| 2,294,605 | Newell | Sept. 1, 1942 |
| 2,294,606 | Newell | Sept. 1, 1942 |
| 2,198,032 | Farmer | Apr. 23, 1940 |
| 2,257,315 | Sorensen | Sept. 30, 1941 |
| 1,665,613 | Tanner | Apr. 10, 1928 |
| 280,322 | Nash | June 26, 1883 |
| 2,278,507 | Baudry | Apr. 7, 1942 |